US012033225B2

(12) United States Patent
Montaldo et al.

(10) Patent No.: US 12,033,225 B2
(45) Date of Patent: Jul. 9, 2024

(54) DYNAMIC DEPLOYING A MOM MODULE ACROSS A PLURALITY OF LAYERS

(71) Applicant: Siemens Aktiengesellschaft, Munich (DE)

(72) Inventors: Ernesto Montaldo, Genoa (IT); Giovanni Venturi, Genoa (IT); Andrea Loleo, Genoa (IT); Giorgio Corsini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 17/427,723

(22) PCT Filed: Jan. 21, 2020

(86) PCT No.: PCT/EP2020/051392
§ 371 (c)(1),
(2) Date: Aug. 2, 2021

(87) PCT Pub. No.: WO2020/156886
PCT Pub. Date: Aug. 6, 2020

(65) Prior Publication Data
US 2022/0114524 A1 Apr. 14, 2022

(30) Foreign Application Priority Data
Feb. 1, 2019 (EP) .................... 19155074

(51) Int. Cl.
*G06Q 50/04* (2012.01)
*G06Q 10/06* (2023.01)
(Continued)

(52) U.S. Cl.
CPC ............. *G06Q 50/04* (2013.01); *G06Q 10/06* (2013.01); *G06Q 10/0633* (2013.01);
(Continued)

(58) Field of Classification Search
CPC ......... G06Q 10/06375; G06Q 10/0633; G06Q 10/067; G06Q 50/04; G06Q 10/06; Y02P 90/30
(Continued)

(56) References Cited

U.S. PATENT DOCUMENTS

2007/0283344 A1   12/2007   Apte et al.
2013/0123964 A1*  5/2013    Cooper ................... G06F 3/067
                                                     700/97
(Continued)

OTHER PUBLICATIONS

Govindaraju, et al., A methodology for Manufacturing Execution Systems (MES) implementation, 114 IOP Conference Series: Materials Science and Engineering 1 (2016) (Year: 2016).*

*Primary Examiner* — Charles Guiliano
(74) *Attorney, Agent, or Firm* — Laurence A. Greenberg; Werner H. Stemer; Ralph E. Locher

(57) ABSTRACT

A method and system for dynamically deploying a module of a manufacturing operations management application across a plurality of layers. A MOM application has a plurality of modules organized in a hierarchical architecture, wherein each module is independently deployable in at least two layers of the plurality of layers; for each module and for each layer wherein the module is deployable, defining a set of production parameters relevant for recommending a layer for module deployment; defining for each module a layer-deploying function, having as input variables values of the production parameter sets for the module and having as output variable a recommended layer wherein the module is to be deployed; and, upon request, for a specific module and for a specific time-point, calculating the recommended deploying layer with the layer-deploying function by using values of the input variables at the requested specific time-point.

5 Claims, 2 Drawing Sheets

(51) Int. Cl.
  *G06Q 10/0633*   (2023.01)
  *G06Q 10/0637*   (2023.01)
  *G06Q 10/067*    (2023.01)

(52) U.S. Cl.
  CPC ..... *G06Q 10/06375* (2013.01); *G06Q 10/067* (2013.01); *Y02P 90/30* (2015.11)

(58) Field of Classification Search
  USPC ........................................................ 705/7.37
  See application file for complete search history.

(56) References Cited

U.S. PATENT DOCUMENTS

| | | | |
|---|---|---|---|
| 2014/0364970 A1* | 12/2014 | Goli | G06F 8/30 |
| | | | 700/86 |
| 2018/0210716 A1 | 7/2018 | Bardini et al. | |
| 2018/0307213 A1 | 10/2018 | Borriello | |
| 2019/0188006 A1* | 6/2019 | Ritter | G06F 8/433 |

* cited by examiner

DYNAMIC DEPLOYING A MOM MODULE ACROSS A PLURALITY OF LAYERS

BACKGROUND OF THE INVENTION

Field of the Invention

The invention relates to a method for dynamic deploying a module of a MOM/MES application across a plurality of layers. Most recently, the term MOM (Manufacturing Operations Management) is more and more used to replace the term MES (Manufacturing Executing System). MES/MOM applications and systems can usually comprise software used as component or act as component in the sense below explained.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens AG offers a broad range of MES/MOM products under its SIMATIC® IT product family.

Nowadays, a typical MOM system consists of a "monolithic" application or, in better cases, it consists of a set of applications that need to be integrated to provide a complete set of MOM functionalities that are required for a target industry.

MOM systems are generally deployed and used on a premise, for example on data centers or dedicated servers in a production site, with the requirement of having a dedicated IT team for software and hardware infrastructure management.

Manufacturing companies demand that the capabilities of MOM systems adapt to the recent manufacturing trends.

A first manufacturing trend is the "globalization" of manufacturing companies and the consequent wider geographic distribution of their manufacturing facilities.

A second manufacturing trend is the "mass customization" request and the consequent needs of new production models focusing on smaller production lots and on flexible production volumes.

These and other manufacturing trends, as well as the new challenges and innovative technologies pushed by worldwide initiatives such as Industry 4.0, are calling for a new generation of MOM systems capable of enabling a more flexible and distributed production paradigm.

In fact, currently, for a specific MOM project, a complex engineering phase is required to find the most suitable distribution of MOM functionalities. Moreover, in case of variations in the production process, the specific MOM system does not adapt to them with the required flexibility.

FIG. 1 is a drawing schematically illustrating the typical physical layer pyramid for manufacturing IT systems.

The physical layer pyramid 10 comprises three physical layers, a field layer 11, an on-site layer 12 and an off-site layer 13.

From an IT perspective, manufacturing companies usually adopt such approach of three physical layers 11, 12, 13 for the distribution of production execution software like e.g. MOM/MES systems, quality systems, planning systems, SCADA (Supervisory Control and Data Acquisition) systems and other production execution applications.

Operations in public clouds are usually performed on the off-site layer 13.

On the on-site layer 12 are usually executed operations which require a mixture of dedicated servers, industrial edge appliances, and hybrid or private clouds.

The field-layer 11 comprise HMI (Human Machine Interface) devices like panels and industrial edge devices like Microbox or Nanobox, SCADA, automation pieces of equipment, PLCs (Programmable Logic Controllers).

Therefore, typically at layer 11 are performed operations which are critical for the facility and which are network dependent. At layer 13 are usually performed non critical operations like e.g. printing a report.

The examples above provided are for illustrations only, the skilled in the art easily appreciate that other deploy of operations and devices is possible for the three layers and that other different layers can be adopted.

Due to the monolithic structure of the majority of MOM systems, the usual current deployment approach is mostly a compromise between centralization and distribution. The centralized approach is usually adopted for enterprise MOM functionalities, such as e.g. overall scheduling. Instead, the distributed approach is usually adopted for shop-floor related MOM functionalities, such as e.g. Production Order Execution or Data Collection).

SUMMARY OF THE INVENTION

It is therefore aim of the present invention to overcome the above mentioned drawbacks by providing a method and a system for deploying a module of a MOM application across a plurality of layers in a dynamic manner.

The aforementioned aim is achieved by a method and a system for dynamic deploying a module of a MOM application across a plurality of layers comprising the following:
  a) providing a MOM/MES application comprising a plurality of modules organized in a hierarchical architecture wherein each module is independently deployable in at least two layers of the plurality of layers;
  b) for each module and for each layer wherein the module is deployable, defining a set of production parameters relevant for recommending a layer for module deployment;
  c) defining for each module a layer-deploying function, having as input variables values of the production parameter sets for the module and having as output variable a recommended layer wherein the module is to be deployed;
  d) upon request, for a specific module and for a specific time-point, calculating the recommended deploying layer with the layer-deploying function by using values of the input variables at the requested specific time-point.

In invention embodiments, upon selection, the specific module may be moved to the recommended layer if different from the actual deploying layer of the specific module.

In invention embodiments, the layer-deploying function optimizes performance parameters selected from the group consisting of cost parameters, production quality parameters, production speed parameters, environmental impact parameters, and energy consumption.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

Embodiments of the invention enable distributing in a flexible manner the core functionalities of MOM applications on a plurality of physical layers in an optimized manner.

Embodiments of the invention provide a high degree of flexibility, scalability and/or a dynamic approach.

Embodiments of the invention allow automatic deploying MOM functional modules at different manufacturing levels, in order to optimize production management.

Embodiments of the invention enable selecting the most efficient deployment level.

Embodiments of the invention enable supporting the global "as a service" transformation trend in alignment with the Digital Factory cloud strategy.

Embodiments of the invention allow flexible horizontal and vertical distribution of MOM functionalities on multiple layers without requiring MOM project re-engineering.

Embodiments of the invention allow deploying the module on multiple physical infrastructures.

Embodiments of the invention allow a time-variant distribution of the MOM modules.

BRIEF DESCRIPTION OF THE SEVERAL VIEWS OF THE DRAWING

The invention will now be described in preferred but not exclusive embodiments with reference to the accompanying drawings, wherein.

DETAILED DESCRIPTION OF THE INVENTION

At least some embodiments of the present invention addresses the above described issue in which a module of a MOM application is deployed across a plurality of layers.

Figure 2:
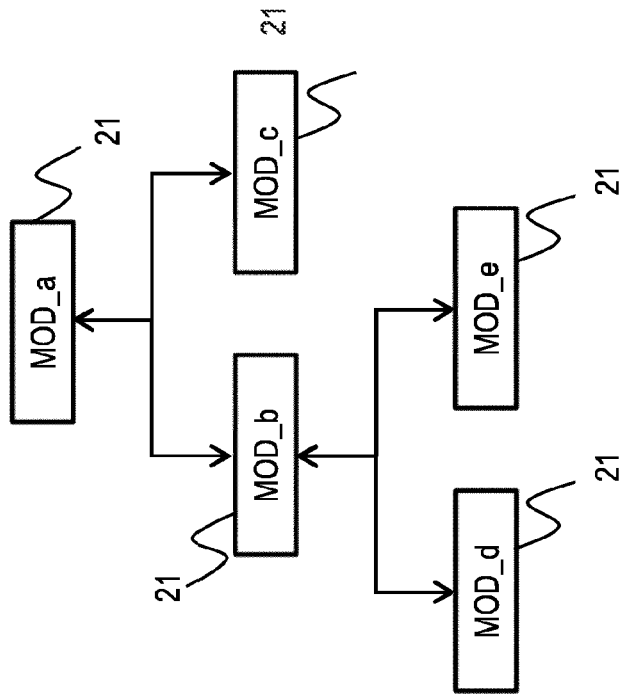
FIG. 2 is a block diagram schematically illustrating a modular architecture of a MOM application according to a first exemplary embodiment of the present invention.
Figure 1:
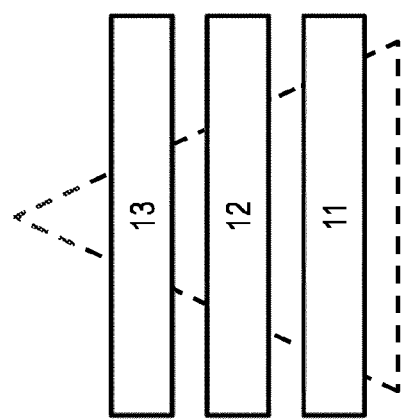
FIG. 1 is a drawing schematically illustrating the typical physical layer pyramid for manufacturing IT systems.

A MOM application is provided comprising a plurality of modules organized in a hierarchical architecture. Each module is independently deployable in at least two layers of the plurality of layers. An exemplary embodiment of independent modules 21 organized in a hierarchical architecture is shown in FIG. 2 where each parent module has a direct interaction with a subset of related children modules. The independent modules may advantageously group one or more MOM functionalities. The modules are defined so that they conveniently support horizontal and vertical distribution of MOM functionalities in a flexible manner.

In embodiments, a suitable distribution of MOM functionalities for a specific MOM project is statically defined at engineering time.

In embodiments, at engineering time, the MOM functionalities that are required for the MOM solution are suitably distributed across layers.

For each module and for each layer wherein the module is deployable, a set of relevant production-parameters is defined for recommending in which layer to deploy the module.

Examples of relevant production parameters useful for layer recommendation purposes include, but are not limited by, the following: production volume, production variability, number of product variants and lot sizes.

For each module, it is defined a layer-deploying function, having as input variables the values of the production parameter sets for the module and relevant layers and having as output variable a recommended layer wherein the module is to be deployed.

The layer-deploy function can be represented with the below deploying formula:

$$\text{DeployLocation}[\text{Mod}_j, \text{Lev}_i] = f(\text{ProdPar}_1[\text{Lev}_i, \text{Mod}_j], \text{ProdPar}_2[\text{Lev}_i, \text{Mod}_j], \ldots, \text{ProdPar}_N[\text{Lev}_i, \text{Mod}_j])$$

Where:

Mod is a specific MOM module "j"

$\text{Lev}_i$ represents the deploying layer of the module. For example, $\text{Lev}_0$ may be the field layer, $\text{Lev}_1$ may be on-site layer and $\text{Lev}_2$ may be the off-site layer.

function f provides the correspondent weight at each production parameter $\text{ProdPar}_K$ relevant for the MOM module "j" when deployed on level "i".

The deploying formula result provides a recommendation rating value for deploying module Mod in level $\text{Lev}_i$ given the specific set of Production Parameters ProdPar1, ProdParN that are considered to be relevant for the specific production process. Therefore, for each module, the optimal recommended deploying-layer is depending on the production parameters relevant for the module in each layer.

Upon request, for a specific module and for a specific time-point, the recommended deploying layer is calculated with the layer-deploying function by using values of the input variables at the requested specific time-point.

Upon selection, the specific module can be moved to the recommended layer if different from the actual deploying layer of the specific module.

Advantageously, with invention embodiments, it is possible to switch the deploying layer of functional modules in a flexible and dynamic way.

Conveniently, a modular architecture enables the distribution of MOM functionalities across multiple layers.

For each MOM functionality, the corresponding deploying layer may advantageously be determined by taking in consideration the relevant production requirements for the specific MOM functionality. For example, low data latency is important for Production Order Execution functionalities and data storage scalability is important for Analytics functionalities.

In embodiments, the formulas of the layer-deploying function may optimize one or more of the following performance parameters: costs, production quality, production speed, environmental impact, energy consumption or any other production performance parameter.

SIMPLE EXAMPLE EMBODIMENT

Figure 3:
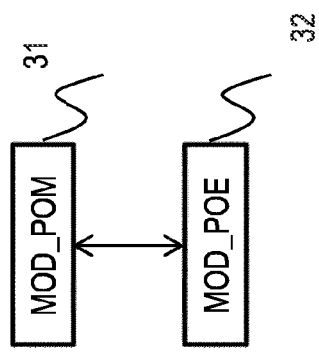
FIG. 3 is a block diagram schematically illustrating a modular architecture of a MOM application according to a second exemplary embodiment of the present invention.

FIG. 3 is a block diagram schematically illustrating modular architecture of a MOM application according to a second exemplary embodiment of the present invention.

Assume for illustration purposes that the MOM application comprises two independent and hierarchically connected MOM modules 31, 32, respectively called Production Order Management ("POM") module 31 and Production Order Execution ("POE") module 32.

The functionalities of the POM module 31 includes checking whether a product can be produced, creating corresponding production orders, optionally splitting the created orders into sub-orders and dispatching them to the POE module 32.

The functionalities of the POE module 32 includes executing the operation defined in the production orders and sending back "as built data" to the POM module 31. Typically, as built data include all production data which have been generated during the execution of the Production Order (e.g. start and end time, consumed materials, etc.)

The following production parameters are considered relevant for the two modules 31, 32: production volume VOL representing the volume of final product to be produced and product variability VAR representing the number of product variants In this simple example embodiment, the layer-deploying function is aimed at optimizing computational costs.

The layer-deploying formula takes in consideration the production parameters VOL, VAR and all the relevant computational costs for managing variations of the production parameters VOL, VAR. Example of computational costs may include, but not limited by: network workload, CPU power, storage requirements and others.

Normalized computational cost calculations for the POM module 31 are shown in the matrix of Table 1 correlating the production parameters VOL, VAR of the POM module.

For example, in this simple example, an increased production volume VOL or even an increased production variability VAR requires more computational resources, e.g. for efficient support of the increased scheduling tasks that would then be better managed with a cloud-based system in layer L2. Therefore with high variability (high VAR) the POM module is better deployed in the Cloud for providing greater computational power to its scheduling calculations.

TABLE 1

| normalized computational costs | | | |
|---|---|---|---|
| | Low VOL | Medium VOL | High VOL |
| Low VAR | 0.10 | 0.20 | 0.40 |
| Medium VAR | 0.35 | 0.60 | 0.65 |
| High VAR | 0.45 | 0.70 | 1.00 |

The values in the cells of table 1 indicate the normalized computational costs for certain ranges (Low, Middle, High) of the production parameters volume VOL and variability VAR for module POM.

The results of the layer-deploying function for optimizing computational costs are shown in the exemplary table 2 where values elaborated in table 1 are discretized according to deployment level recommendations $Lev_i$ for the specific POM module $Mod_j$.

TABLE 2

| recommended deploying-level | |
|---|---|
| Outcome of deploy formula for module POM | Recommended deploying Level |
| 0.00-0.40 | $Lev_0$ |
| 0.41-0.65 | $Lev_1$ |
| 0.66-1.00 | $Lev_2$ |

Similarly, corresponding tables for the POE module may be generated to determine the recommended deployment-level.

Figure 4:
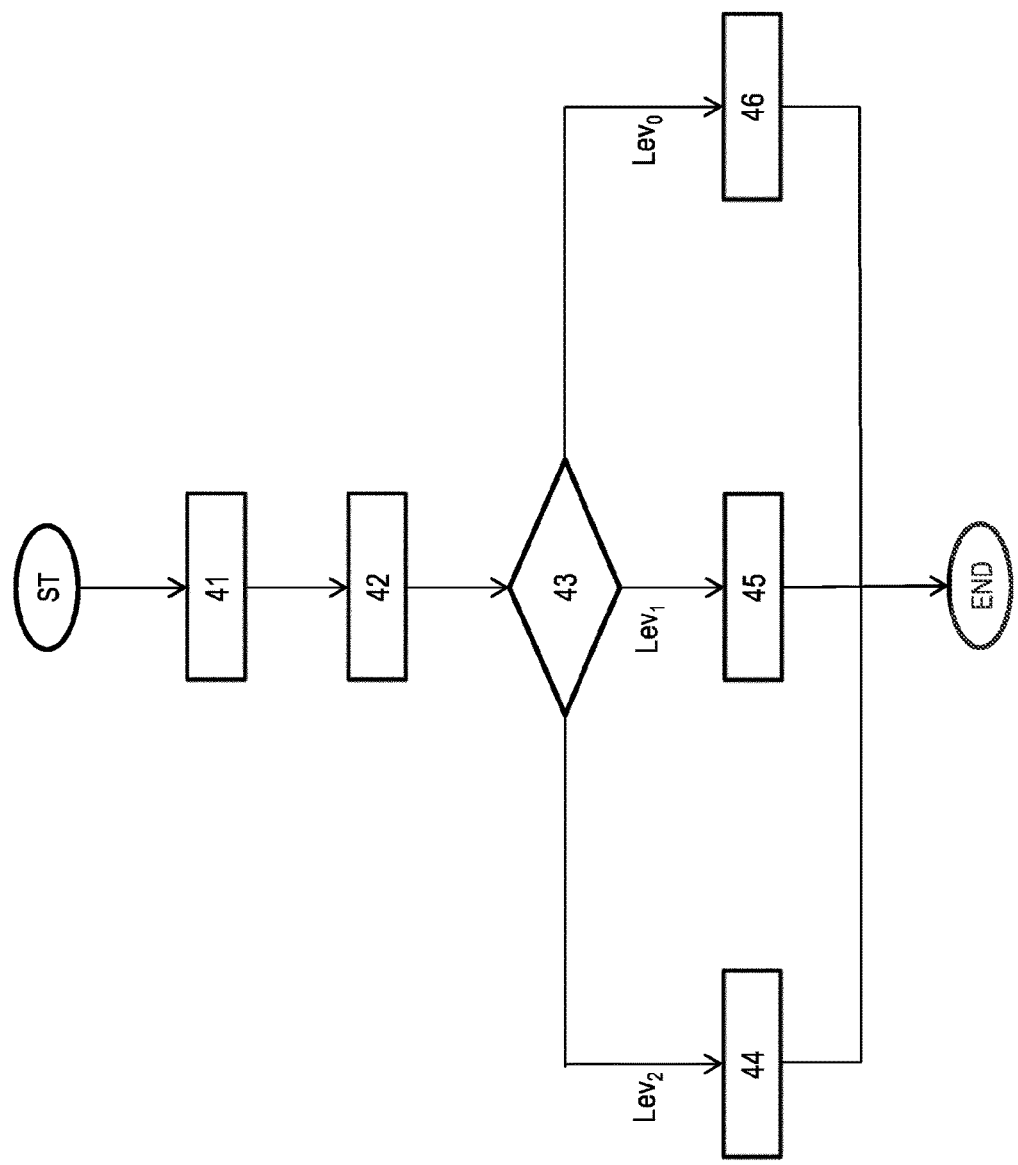
FIG. 4 is a flow chart schematically illustrating an example embodiment of dynamic deploying of one or more modules across three layers.

FIG. 4 is a flow chart schematically illustrating an example embodiment of dynamic deploying of one or more modules across three layers.

At step 41, a module $Mod_j$ corresponding to a given MOM functionality is selected.

At step 42, the deploying formula with the given parameter values for module Mod for each relevant deploying level $Lev_i$ is calculated for a specific point of time.

At step 40, the deploying formula provides as outcome a recommended layer among the three layers $Lev_1$, $Lev_2$ and $Lev_3$ where the module Modj is to be deployed.

If the recommended layer is different than the actual deployed layer, then at steps 440, 450, 460 are executed all the necessary the steps to move the module Mj to the recommended layers.

Example of such necessary switching steps include, but are not limited by, automatic actions (e.g. automatic shutdown of MOM modules and restart on a different level), requesting for manual activities to plant supervisors, a mixture of automatic and manual activities.

In embodiments, steps 41-46 may conveniently be repeated for every module. In other embodiments, steps 41-46 may conveniently be repeated for different points in time or upon notifications, e.g. upon variations of certain production parameters or user requests.

The invention claimed is:

1. A method for dynamic deploying a module of a manufacturing operations management application across a plurality of layers, the method comprising the following steps:
    providing a manufacturing operations management/manufacturing executing system application with a plurality of modules organized in a hierarchical architecture, wherein each of the modules is independently deployable in at least two layers of the plurality of layers;
    for each module and for each layer in which the module is deployable, defining a set of production parameters relevant for recommending a layer for module deployment;
    defining for each module, a layer-deploying function having, as input variables, values of the production parameter sets for the module and having, as an output variable, a recommended deploying layer in which the module is to be deployed;
    upon request, for a specific module and for a specific point in time, calculating the recommended deploying layer with the layer-deploying function by using values of the input variables at the specific point in time, wherein the recommended deploying layer is selected from a group consisting of a field layer, an on-site layer, and an off-site layer; and
    moving the specific module to the recommended deploying layer by at least shutting down the specific module on an actual deploying layer and restarting the specific module on the recommended deploying layer.

2. The method according to claim 1, wherein the layer-deploying function comprises formulas for optimizing performance parameters selected from a group consisting of:
cost parameters;
production quality parameters;
production speed parameters;
environmental impact parameters; and
energy consumption.

3. A non-transitory computer readable medium containing a set of computer executable instructions for performing steps of the method according to claim 1.

4. A system for dynamically deploying a module of a manufacturing operations management application across a plurality of layers, the system comprising:
a manufacturing operations management/manufacturing executing system application comprising a plurality of modules organized in a hierarchical architecture, wherein each of the modules is independently deployable in at least two layers of the plurality of layers;
for each module and for each layer wherein the module is deployable, means for defining a set of production parameters relevant for recommending a layer for module deployment;
a processor configured for defining for each module a layer-deploying function, said layer-deploying function having, as input variables, values of the production parameter sets for the module and having as an output variable, a recommended deploying layer wherein the module is to be deployed;
said processor configured for calculating upon request, for a specific module and for a specific point in time, the recommended deploying layer with the layer-deploying function by using values of the input variables at the requested specific point in time, wherein the recommended deploying layer is selected from a group consisting of a field layer, an on-site layer, and an off-site layer; and
said processor configured for moving upon selection the specific module to the recommended deploying layer if different from an actual deploying layer of the specific module, wherein the moving includes at least shutting down the specific module on the actual deploying layer and restarting the specific module on the recommended deploying layer.

5. The system according to claim 4, wherein formulas of the layer-deploying function optimizes performance parameters selected from a group consisting of:
cost parameters;
production quality parameters;
production speed parameters;
environmental impact parameters; and
energy consumption.

* * * * *